Figure 1:
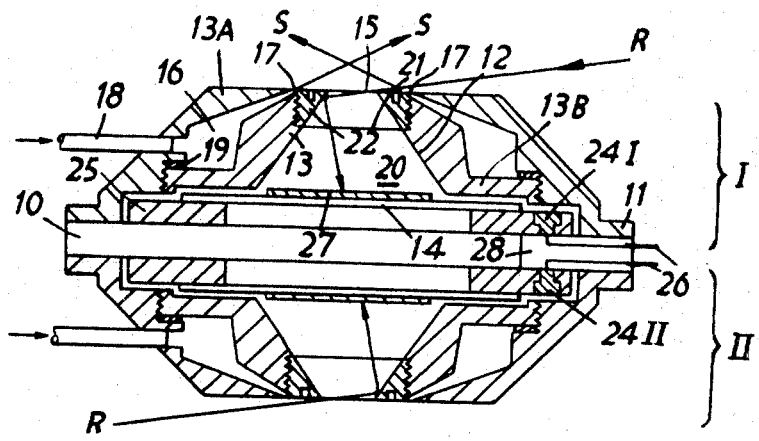

United States Patent [19]
Volkovisky

[11] 3,760,187
[45] Sept. 18, 1973

[54] APPARATUS FOR MEASURING RADIATION

[75] Inventor: Victor V. Valkovisky, Paris, France

[73] Assignee: Compteurs-Schlumberger, Montrouge, France

[22] Filed: Feb. 11, 1972

[21] Appl. No.: 225,516

[30] Foreign Application Priority Data
Feb. 12, 1971   France .................................. 7104778

[52] U.S. Cl. ................................ 250/349, 250/353
[51] Int. Cl. ............................................. G01t 1/16
[58] Field of Search ..................... 250/83.3 H, 349; 73/355 R

[56] References Cited
UNITED STATES PATENTS
3,453,432   7/1969   McHenry ...................... 250/83.3 H
3,465,149   9/1969   Flint ............................... 250/83.3 H
3,629,585   12/1971   DeSvignes et al. ............ 250/83.3 H Primary Examiner—James W. Lawrence
Assistant Examiner—Davis L. Willis
Attorney—William R. Sherman et al.

[57] ABSTRACT

The radiation measuring apparatus comprises two absorbent cavities each having a geometrical form of revolution of general trunconical shape with reflecting lateral walls, the outer base being provided with an axial orifice forming a passage for the radiation to be measured and the inner base comprising the central junctions of a star-shaped thermopile. A window transparent to the radiation is disposed between these two bases, and the two cavities are assembled on their inner base by means of a support.

5 Claims, 5 Drawing Figures

APPARATUS FOR MEASURING RADIATION

The present ivvention relates to apparatuses for measuring radiation, or radiation meters, and more precisely to apparatuses which are intended to measure the total radiation, that is to say both the solar and terrestrial radiation.

When it is desired to measure the difference between the radiation directed towards the ground and the radiation directed towards space in order to establish the radiation balance at any point on the earth, a radiation meter of the differential type is used, comprising two elements sensitive to radiation, one facing downwards, the other facing upwards.

The invention is concerned with such a differential apparatus, capable of measuring the total radiation, solar and terrestrial, or the radiation balance or even the global solar radiation.

Differential radiation meters are already known in which two sorts of means are used for protecting the radiation-sensitive surfaces against natural ventilation and atmospheric agents.

In a first category of apparatuses, the sensitive surfaces are protected by hemispherical bells made of very thin special polyethylene, blown up with nitrogen, and having suitable transmission properties for the radiation. Nevertheless the bells have the disadvantage of being fragile and of having their optical properties altered in time both by atmospheric agents and by ultra violet solar radiation. Bells made of thin glass are generally employed, which are more resistant but have the defect of being opaque to infra red rays of wavelength greater than a few microns. Moreover, when these bells get wet on the outside, the radiation and convection exchange conditions are modified, which renders the measurement erroneous.

In a second category of apparatuses, the sensitive surfaces are left uncovered, but are ventilated by a blower. The sensitivity of the apparatus is then diminished and cannot be maintained constant owing to the thermal exchanges between the sensitive surfaces and the air. Likewise, the measurements lose their significance when the sensitive surfaces get wet, as evaporation totally modifies the thermal exchanges.

Moreover, in all these instruments, the sensitive surfaces are directly exposed to the radiation which arrives from a solid angle of $2\pi$ steradians. As their coefficient of absorption varies substantially with the angle of incidence and with the wavelength of the ray considered, the rays which arrive with a large angle of incidence are reflected and are not taken into account in the determination of the radiation balance.

An object of the invention is to remedy these disadvantages by means of features combining absorbent cavities behaving substantially as a black body with thermopile detectors of appropriate form.

The apparatus for measuring radiation according to the invention comprises two absorbent cavities each having a geometrical form of revolution of generally trunconical shape with reflecting lateral walls, the outer base being provided with an axial orifice formng a passage for the radiation to be measured and the inner base comprising the central junctions of a star-shaped thermopile; a window transparent to the radiation is disposed between these two bases, and these two cavities are assembled on their inner base by the intermediary of a support.

Secondary features provide, in addition, for the protection of the orifice of each cavity against atmospheric agents by a convergent jet of gas blown through an opening or openings formed in the envelope of these cavities.

With respect to the known solutions, the invention has numerous advantages, such as:
protection without disturbing effects on the measurement,
water-tightness of the detector,
measurement of radiation through an angle of $4\pi$ or $2\pi$ steradians due to the quasi-total reflectivity of the lateral walls of the cavities,
small time constant by making the thermopiles by thin layer vacuum deposition,
constant temperature of the block forming the two cavities and containing the detectors, with the possbility of thermostatically controlling the apparatus by regulating the temperature of the blown gas or by circulating an auxiliary fluid,
easy dismantleability of the various constituent elements, etc......

Other particularities and advantages of the invention will become apparent from the following description and from the accompanying drawing which shows, by way of non-limiting example, a preferred embodiment of the invention.

Figure 2:
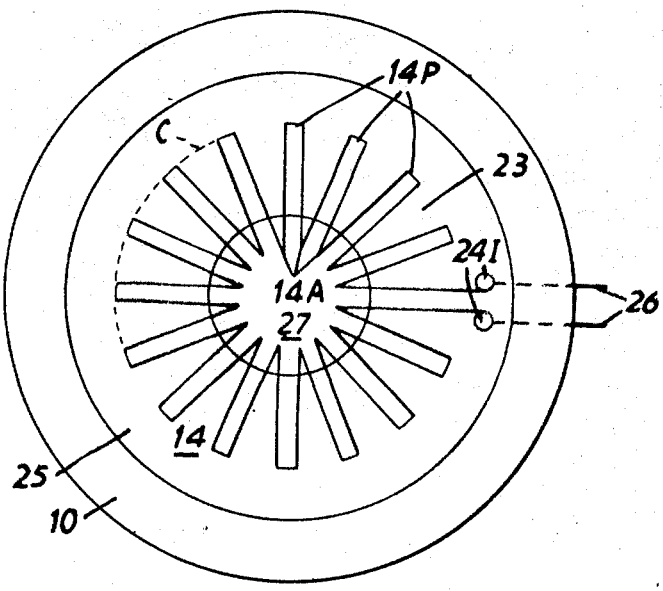
Figure 3:
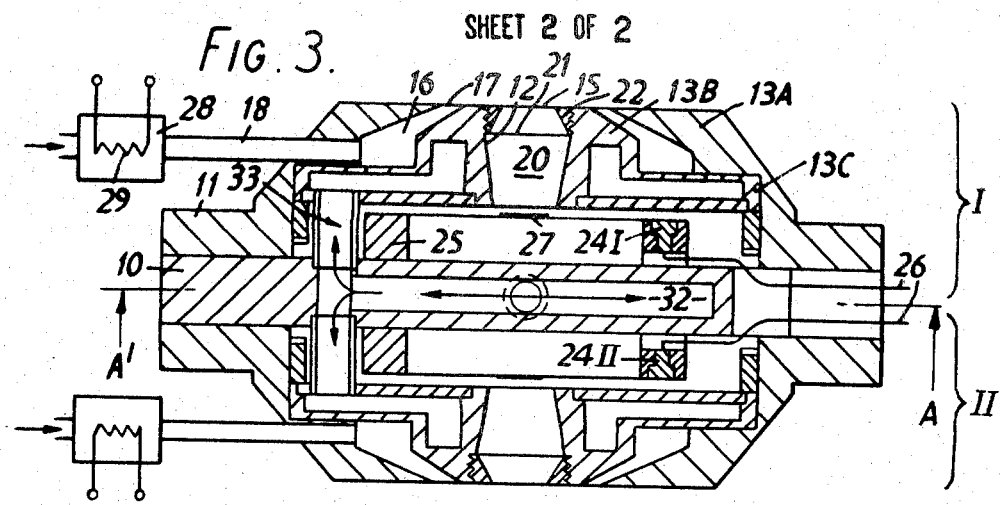
Figure 4:
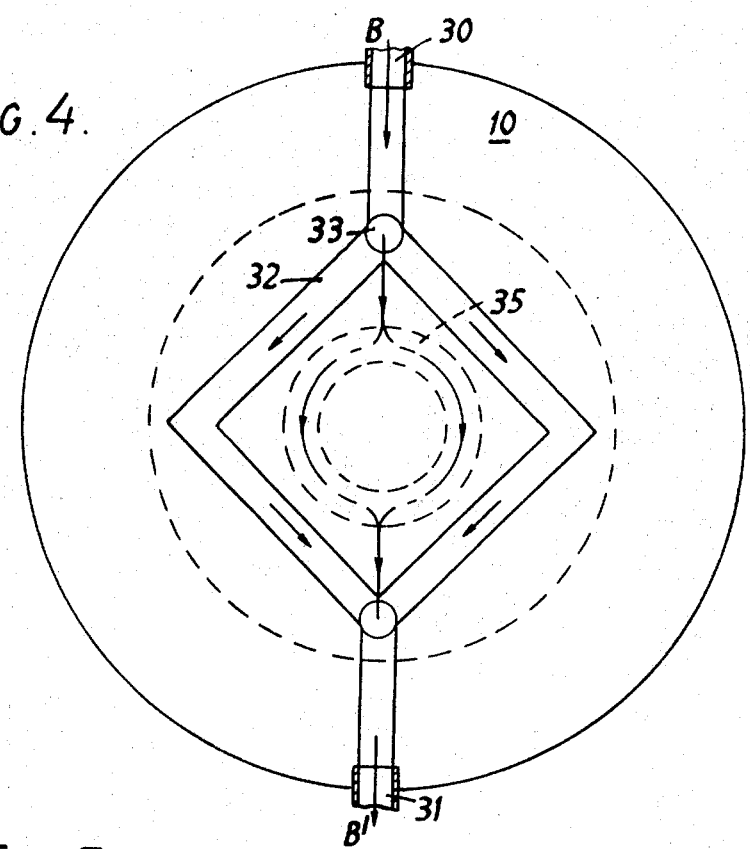
Figure 5:
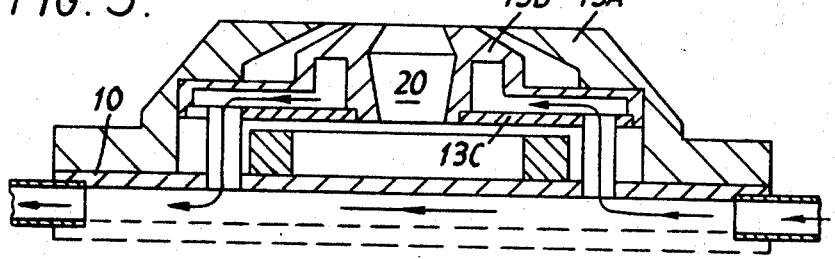

In this drawing:

FIG. 1 shows an axial section of an embodiment of a radiation meter according to the invention, FIG. 2 is a view from above of this apparatus after removal of the upper envelope, FIG. 3 is an axial section of another embodiment of a radiation meter according to the invention, FIG. 4 is a section along A—A' of FIG. 3, and FIG. 5 is a section along B—B' of FIG. 4.

The radiation meter of FIGS. 1 and 2 comprises two identical parts, the upper one I and the lower one II, assembled by their collar 11 on a metal support 10, for example by means of bolts or any other equivalent means. The description will thus be limited to the upper part I. Each absorbent cavity 20 has a form of revolution, chosen in this example as being trunconical, delimited by the lateral walls 12 of the envelope 13; the small base of the truncated cone is represented by an orifice 15 centred on the axis of the apparatus and having a diameter of about a few millimetres and the large base is represented by the receiving area of a detector 14. The walls 12 are rendered reflective first by optical polishing and then by being covered with a thin layer of gold which has an excellent coefficient of reflection in the infra red.

The angle at the summit of the cone is determined so that any ray R penetrating through the orifice 15 with any angle of incidence will reach directly or by reflection on the walls 12 the receiving area of the detector 14.

In the envelope 13 are formed channels 16 leading to the vicinity of the orifice 15 and permitting an axially convergent jet S of air or dry gas to be blown through openings 17; the air or gas is brought in under pressure from an external source through a conduit 18. A sheet-like flow is thus achieved, impeding the penetration of atmospheric agents into the cavity. The channels 16 are for example formed by making the envelope 13 in two parts, the inner part 13B being assembled on the outer part 13A by screwing with the interposition of a sealing ring 19.

In the inner envelope 13B is also mounted, perpendicular to the axis of the truncated cone, a water-tight window 21 which is transparent to the radiation, constituted for example by a sheet of thallium iodide bromide, or KRS-5 (Trademark), about one millimetre thick, or again by a film of polyethylene (Lupolen H — Trademark) about 0.1 millimetres thick, coated with an appropriate anti-reflecting layer. This sheet, which is intended to ensure the water-tightness of the detector and to isolate it from the zone of turbulance at the inlet of the truncated cone, is advantageously arranged to be dismantleable in order to permit its cleaning. For this purpose, it is held by a threaded plug 22 which constitutes the small base of the truncated cone and comprises the orifice 15.

The detector 14 is a thermopile of star shape, as shown in FIG. 2, in which the active junctions 14A are regularly distributed at the centre whereas the passive junctions 14P are at the ends of the branches of the star distributed around the periphery on a circumference C. This thermopile is preferably made by vacuum deposition on an insulating support 23 of two alloys which can form couples of high thermoelectric power, such as the couples based on bismuth and antimony. The insulating support 23 is a film of polyethylene terepthalate or "mylar" (Trademark) having a thickness of about 1 micron.

The receiving area of the thermopile, that is to say the part constituting the large base of the truncated cone and comprising the active junctions 14A subjected to the radiation — direct or reflected by the walls 12 —, is covered with an absorbent layer of metallic black 27, such as gold black or platinum black. The passive junctions 14P are not subjected to the radiation, but on the contrary, are masked from it by the flange 13B formed at the base of the piece 13.

The mylar support 23 is stretched over a metal ring 25, such that the passive junctions 14P are disposed in thermal contact with this ring, that is to say in a zone where they are practically at the constant temperature of the heat sink thus constituted by the body of the apparatus of which the ring forms a part. The support 10, which forms a part of this heat sink, helps to keep the two cavities at the same temperature.

The electromotive force furnished by the thermopile 14, which at each instant is proportional to the energetic irradiation of the irradiated area, is picked up at the terminals 24 I for the thermopile of the upper part I, 24 II for those of the lower part II. These terminals traverse the ring 25 by means of an insulating sheath and insulated conductors pass through a hole formed in the support 10 and lead to output pins 26 permitting the two thermopiles to be connected in accordance with the type of measurement that it is wished to carry out.

During operation as a differential radiation meter, the two thermopiles are electrically connected in series opposition and thus furnish a differential voltage which varies linearly as a function of the difference between the fluxes respectively absorbed by each of the cavities.

If it is desired to measure the global radiation in a solid angle of $4\pi$ steradians, the two thermopiles are connected in series.

Finally, the apparatus can obviously be used as a single radiation meter by closing the orifice 15 of one of the two cavities and measuring the electromotive force picked up at the terminals of the thermopile of the single irradiated cavity.

It is advantageous to thermostatically control the apparatus to a temperature higher than the ambiant temperature by suitability regulating, for example by means of a heating resistance, the temperature of the blowngas, or again by providing a closed circuit circulation of auxiliary fluid through the body of the apparatus.

Both these features are shown in the embodiment illustrated in FIGS. 3 to 5. To the extent that this embodiment is similar to the embodiment of FIGS. 1 and 2, the same reference numerals have been used and the description will not be repeated.

With reference to FIG. 3, a thermostatic control device 28, including heating element 29, is mounted on the air (or gas) inlet conduit 18. This thermostatic device 28 maintains the inlet gas and hence the cavity 20 at a constant temperature.

This radiation meter also provides for thermostatic temperature control by the circulation of another fluid, e.g. water, through channels formed in the body specifically for that purpose These channels are shown in FIGS. 3, 4 and 5 and include, as well as an inlet 30 and an outlet 31, passages 32, 33, 34 and 35. The passages 32 are formed in the support 10, and the passages 34, 35 are formed in the envelope 13; the passages 33 interconnect 32 and 34. The passage 35 surrounds the cavity 20. In this embodiment the envelope 13 is made in three pieces 13A, 13B and 13C, the additional piece 13C forming one side of the passages 34 and 35. The means for thermostatically controlling the temperature of the water are now shown.

The shape of the cavities 20 is not critical in itself, and two difference shapes have been shown in the two different embodiments described by way of example. In the embodiment of FIGS. 1 and 2 each cavity is in the form of a single truncated cone whose small base forms the orifice 15 and whose large base defines the receiving area for the radiation, where the detector 14 is positioned. In the embodiment of FIGS. 3 to 5, the cavity is in the form of a double truncated cone having a common large base where the transparent window 21 is located. One small base forms the orifice 15 and the other small base forms the receiving area for the detector.

Although the shape of the cavities is not critical, two considerations should be borne in mind. First, the role of the cavity is to take the rays entering through the orifice 15 and reflect them towards the thermopile where it is desirable that they arrive with an angle of incidence smaller than a limit value which could be set for example at about 45°. It is desirable that the rays, whatever their wavelength, are all absorbed in the same manner by the layer 27, and this would not be the case if the rays fell on that layer with an angle of incidence that was too oblique. Second, although it is advantageous that all the entrant rays are reflected towards the layer 27, it is nevertheless desirable to ensure that the area of the layer 27 is not too great with respect to the area of the orifice 15. This is because the flux density received by the layer 27 decreases as the ratio of these areas increases which implies that the output signal from the radiation meter would be correspondingly decreased.

Other geometrcial forms of revolution can also be used for the cavities, and the following can be mentioned by way of example: a truncated cone and a cylinder mounted one on top of the other, a cylinder surmounted by a spherical dome, a paraboloid etc.....

The apparatus is also capable of measuring selected wavelength bands of radiation by substituting for the water-tight window an interference filter. This can be useful in certain applications such as in military applications using infra red or in climatology for measuring the flux reflected by the clouds, where it is desired to limit the radiation received to a particular band of wavelengths. An absorbing filter cannot be used for it would heat up and thus disturb the measurement. However, an interference filter can be used. Such a filter has several layers of respectively low and high indices of refraction, laid down in a suitable order and in suitable thicknesses on a support of low coefficient of absorption. This type of filter eliminates by interference the radiation that it is desired not to transmit while allowing the radiation to pass through in the wave band chosen.

The invention is not limited to the embodiments which have been described by way of example and modifications can be made without departing from its scope.

I claim:

1. Apparatus for measuring radiation comprising a central support; two opaque envelopes mounted on opposite sides of said central support, each envelope having inner walls defining a peripheral flange and an absorbent central cavity having a geometrical form of revolution doubly truncated so as to have two geometrical bases one of which is an inner base and is located near said central support and the other of which is an outer base and is provided with an orifice for the passage of the radiation to be measured; two star-shaped thermopiles disposed on opposite sides of said central support, each thermopile having active junctions at its center and passive junctions on the branches of the star, and being disposed in each envelope on said central support so that its active junctions are in the vicinity of said inner base of the cavity and its passive junctions masked by said peripheral flange; and a water-tight window transparent to the radiation to be measured disposed in each cavity between its two bases; said absorbent cavity having its inner base larger than its outer base and being adapted to reflect radiation entering the cavity through the orifice in the outer base, onto the active junctions of said star-shaped thermopile.

2. Measuring apparatus according to claim 1, wherein each envelope comprises an outer part mounted on said central support and an inner part including said peripheral flange, said absorbent cavity and said water-tight window, said outer and inner parts being shaped and assembled so as to define hollow channels therebetween, said channels having openings in the vicinity of the orifice of said absorbent cavity and being fed with gas whereby a jet of gas is blown in a sheet-like form in front of each said orifice so as to impede the deposition of atmospheric agents on the water-tight transparent window.

3. Measuring apparatus according to claim 1, in which said water-tight window is in the form of an interference filter which transmits only certain wavebands of radiation.

4. Measuring apparatus according to claim 2, further comprising channel means in said central support and said inner parts of said envelopes for the circulation of an auxiliary fluid at constant temperature.

5. Measuring apparatus according to claim 2, wherein said gas is provided by blowing means including a heating resistance over which passes the blown gas.

* * * * *